(12) United States Patent
Roodenburg et al.

(10) Patent No.: US 8,998,534 B2
(45) Date of Patent: Apr. 7, 2015

(54) MARINE TENSIONER

(75) Inventors: Joop Roodenburg, Delft (NL); Ronny Lambertus Waltherus Nouwens, Schiedam (NL)

(73) Assignee: Itrec B.V., Schiedam (NL)

( * ) Notice: Subject to any disclaimer, the term of this patent is extended or adjusted under 35 U.S.C. 154(b) by 98 days.

(21) Appl. No.: 13/882,515

(22) PCT Filed: Nov. 8, 2011

(86) PCT No.: PCT/NL2011/050760
§ 371 (c)(1),
(2), (4) Date: May 31, 2013

(87) PCT Pub. No.: WO2012/064185
PCT Pub. Date: May 18, 2012

(65) Prior Publication Data
US 2013/0243529 A1    Sep. 19, 2013

Related U.S. Application Data

(60) Provisional application No. 61/412,291, filed on Nov. 10, 2010, provisional application No. 61/489,001, filed on May 23, 2011.

(51) Int. Cl.
*F16L 1/23* (2006.01)
*B63B 35/03* (2006.01)
*F16L 1/235* (2006.01)

(52) U.S. Cl.
CPC . *F16L 1/23* (2013.01); *B63B 35/03* (2013.01); *F16L 1/235* (2013.01)

(58) Field of Classification Search
CPC ............... F16L 1/23; F16L 1/19; F16L 1/207; F16L 1/235; B63B 35/03

USPC .................... 405/158, 166, 167, 168.3, 168.4
See application file for complete search history.

(56) References Cited

U.S. PATENT DOCUMENTS 3,022,928 A    2/1962   Ulmitz
3,881,647 A *   5/1975   Wolfe ........................... 226/172

(Continued)

FOREIGN PATENT DOCUMENTS

WO    WO 2009/088287 A2    7/2009

*Primary Examiner* — John Kreck
*Assistant Examiner* — Carib Oquendo
(74) *Attorney, Agent, or Firm* — Birch, Stewart, Kolasch & Birch, LLP

(57) ABSTRACT

The invention is directed to a marine tensioner (1) for handling an elongated article from an offshore vessel. The tensioner comprises a tensioner frame (11), multiple track units (20), wherein each track unit comprises an elongated chassis (30) and an endless track supported by said chassis, wherein between the chassis of each track unit and the tensioner frame a connecting structure (40,140) is provided that at least allows for lateral motion of the track unit with respect to the passage axis (26) so as to adapt the position of the track unit. For each track unit a group of hydraulic squeeze cylinders (50a, 50b, 50c) is provided between the tensioner frame and the chassis of the track unit. The tensioner further comprises a tilting mechanism (60) for the group of squeeze cylinders of each track unit, said tilting mechanism being adapted to tilt the hydraulic squeeze cylinders of a track unit between an operative position, wherein the squeeze cylinders are operative to exert a squeeze force in use of the tensioner for handling an elongated article, and an oversized article passage position.

13 Claims, 9 Drawing Sheets

(56) References Cited

U.S. PATENT DOCUMENTS

| | | | |
|---|---|---|---|
| 4,810,132 A * | 3/1989 | Diehl | 405/166 |
| 5,533,834 A * | 7/1996 | Recalde | 405/168.3 |
| 5,692,859 A | 12/1997 | Dickson et al. | |
| 6,439,445 B1 | 8/2002 | De Groot et al. | |
| 6,450,385 B1 * | 9/2002 | Guerin | 226/89 |
| 7,427,006 B2 * | 9/2008 | Diehl | 226/172 |
| 7,682,106 B1 * | 3/2010 | Bowar et al. | 405/184.2 |
| 7,857,042 B2 * | 12/2010 | Koopmans et al. | 166/77.3 |

* cited by examiner

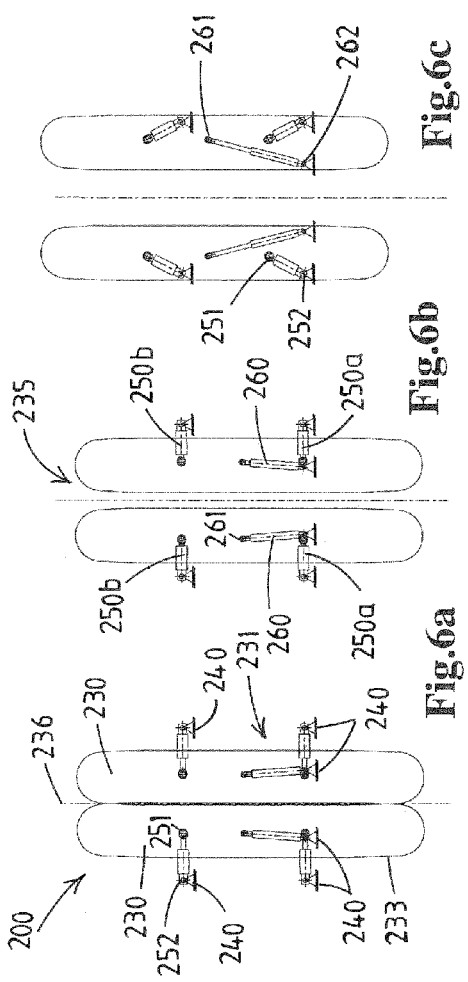

MARINE TENSIONER

This application is the National Phase of PCT/NL2011/050760 filed on Nov. 8, 2011, which claims priority under 35 U.S.C. 119(e) to U.S. Provisional Application Nos. 61/412,291 filed on Nov. 10, 2010 and 61/489,001 filed on May 23, 2011, all of which are hereby expressly incorporated by reference into the present application.

The present invention relates to a marine tensioner for handling an elongated article from an offshore vessel, such as laying a pipeline from a marine pipeline installation on board a vessel wherein a pipeline for transportation of hydrocarbons (oil, gas, etc) is laid on the seabed. The tensioner may also be embodied and/or used for handling other elongated articles, such as hydrocarbon risers, as well as e.g. an umbilical (e.g. for subsea equipment, ROV, geosurveying tooling, etc) from an umbilical handling device on board the vessel, said tensioner being adapted to absorb the load exerted by said elongated article on the tensioner.

Tensioners are well known in the field of marine pipelaying, often having the task of supporting the weight of the launched pipeline. Tensioners are used for many pipelaying techniques, such as S-lay, Reel lay, J-lay, but also for laying electrical cables, fiberglass cables, etc. etc. Tensioner having a large "load holding capacity" and in the field capacities of tens of tonnes, or even well over 100 tonnes, for a tensioner are not uncommon. An example of a tensioner is disclosed in U.S. Pat. No. 6,439,445 (Itrec).

In a known embodiment a marine pipeline installation tensioner comprises a tensioner frame and multiple track units mounted in said frame defining n article passage having a passage axis extending axially, and preferably centrally, through the tensioner frame. The number of track units is normally adapted to the capacity and/or pipeline type and common tensioner designs include two, three or four track units (or possibly a variable number of track units).

Each track unit includes an elongated chassis, said chassis having end portions at opposed ends thereof as well as a central portion between said end portions. Each track unit further comprises an endless track supported by said chassis, e.g. with support rollers or other bearing means being mounted on the chassis for supporting the endless track, and a track motion control device for effecting controlled motion of the endless track. The endless track is adapted to engage on the elongated article, commonly as the endless track has a multitude of friction elements, usually friction pads.

It is known to arrange each track unit mobile within the associated frame so that the "gap" or "pipeline passage" between the tracks can be adapted to different pipeline diameters and possible to allow for an "widely opened" position of the track units wherein a large item (e.g. an accessory fitted in or on the pipeline, such as a pipeline connector) can pass through the tensioner. Between the chassis of each track unit and the tensioner frame a connecting structure is provided that at least allows for lateral motion of the track unit with respect to the passage axis so as to adapt the position of the track unit.

From U.S. Pat. No. 6,439,445 it is known to provide hydraulic cylinders between the frame of the tensioner and the chassis of the track unit to create the "squeeze pressure" between the track and the exterior of the elongated article, which is needed to hold the elongated article and absorb the load of the elongated article on the basis of friction and also to allow for displacement of the track unit to adapt to the pipeline diameter. It will be understood that the "squeeze pressure" needed between the elongated article and the tracks is very significant as the resultant frictional force might need to be several tens of tonnes, or even well over one hundred tonnes. The desire for very large elongated article weight support capacity of the tensioner e.g. stems from the desire to develop oil and gas fields in deepwater, where water depth (and thus length of launched pipeline supported by the tensioner, or multiple tensioners in series) might be more than 500 meters, or even over 1000 meters.

A cylinder control mechanism is provided which is associated with said squeeze cylinders and allows to control the squeeze force exerted by the friction elements of the endless track of the track unit on the elongated article.

The pipelines to be launched with a pipelaying vessel equipped with a marine pipelaying system including one or more tensioners can vary significantly, i.e. with respect to pipeline properties (rigid pipeline or flexible pipeline, coated or non-coated, reeled or non-reeled, etc). Therefore the need exists for tensioners to be able to handle a wide range of different pipelines (possibly fitted with accessories having a larger cross-section than the pipeline itself).

When handling bigger pipes, and/or pipes with larger accessories, the dimensions of the prior art tensioners have increased accordingly.

For instance, the outer dimensions of the tensioner frame have increased when larger accessories are to pass the tensioner, such that the squeeze cylinders and the chassis of the track unit can be retracted sufficiently for the accessory to pass.

The present invention aims to propose an improved marine tensioner.

The invention achieves the above aim by providing a marine tensioner according to the preamble of claim 1, wherein the tensioner further comprises a tilting mechanism for the group of squeeze cylinders of each track unit, each hydraulic squeeze cylinder being connected, preferably at its end facing the tensioner frame, to said tilting mechanism, wherein said tilting mechanism comprises a drive motor distinct from the squeeze cylinders, and said tilting mechanism being adapted to tilt the hydraulic squeeze cylinders of a track unit between an operative position, wherein the squeeze cylinders are operative to exert a squeeze force in use of the tensioner for handling an elongated article, and an oversized article passage position, wherein—to allow for the passage of an oversized article through the tensioner, without exerting a squeeze force with the track unit, the track unit is moved maximally towards the tensioner frame—the effective dimension of the tilted squeeze cylinders seen in lateral direction is less than with said squeeze cylinders in fully retracted condition in their operative position.

By allowing tilt of the hydraulic squeeze cylinders, the retraction of the chassis of the track unit to allow the passage of large items, such as accessories, is not only achieved by retraction of the squeeze cylinders, but also by the tilt of the squeeze cylinders. Thus, the chassis of the track unit can be retracted significantly closer to the tensioner frame. In all, a more compact tensioner is obtained.

For example, the squeeze cylinders are provided perpendicular to the tensioner frame when handling elongated articles. To allow the passage of large items, the squeeze cylinders are fully retracted, to provide the maximum space. With the tilting mechanism according to the invention, the squeeze cylinders can be tilted, e.g. such that the squeeze cylinders include an angle of 45° with the tensioner frame. Even larger retractions can be obtained when the cylinders include a sharper angle with the tensioner frame. As such, the retraction can be increased to almost 100%. A reason for this large retraction is that upon operation, squeeze cylinders have a dead length which is generally quite substantial. This dead length can now be retracted as well.

Preferably, the tilting mechanism comprises a frame composed of a steel plate. This can have very small dimensions, further contributing to the compactness of the tensioner. Alternatively, the tilting mechanism can comprise rods.

The tilting mechanism may be provided, seen in lateral direction, essentially entirely between the frame side of the squeeze actuators and the tensioner frame. Alternatively, the tilting mechanism can be situated partially adjacent the squeeze actuators, and partially between the frame side of the squeeze actuators and the tensioner frame. As such, the actuated subframe can have relatively large dimensions, not contributing to an increased tensioner frame dimension.

Preferably multiple squeeze cylinders are provided between a track unit chassis and the frame at spaced locations along the length of the chassis.

In a highly preferred embodiment, a central squeeze cylinder, or more preferably a pair of central squeeze cylinders operating in parallel, is arranged so as to engage on the central portion of the chassis and at least two further squeeze cylinders (or squeeze cylinder pairs) are provided, each engaging on a respective end portion of the chassis.

By three (pairs of) squeeze cylinders along the length of the chassis, the effective stiffness of the chassis is far greater than with merely two cylinders acting on the chassis.

Preferably the squeeze cylinders are arranged to be directed substantially in a plane normal to the elongated article axis during operation of the tensioner, preferably within a range of at most 20 degrees with respect said plane.

Preferably a cylinder control mechanism is provided which is associated with the squeeze cylinders and allows to control the squeeze force exerted by friction elements of the endless track of the track unit on the elongated article.

Preferably the cylinder control mechanism is adapted to compensate for vessel motion and/or sea state induced load variation. It will be appreciated that sea state induced vessel motions are likely to cause a periodic variation of the pipeline load on the tensioner. Preferably the squeeze force variation is measured (directly or indirectly, e.g. by monitoring vessel motion) and the cylinders are then controlled to counteract any undesirable variation. This requires the cylinders and the cylinder control mechanism to have a response significantly faster then of the disturbance, for instance allowing actuation of the cylinders at a frequency of at least 1 Hz, preferably of at least 20 Hz.

In practice a computer or similar will be included in the cylinder control mechanism, this computer then including a program or routine which—in combination with e.g. hydraulic valves in a hydraulic cylinder control mechanism, allows to operate the actuator system at a relatively high frequency, e.g. at least at 1 Hz.

Preferably at the point of engagement of each squeeze cylinder on the chassis a load cell is provided for measuring the actual force exerted at said location, a force signal of this load cell being transmitted to the cylinder control mechanism to control the squeeze force.

An alternative for a squeeze cylinder designs can for instance be a screw spindle actuator, which has already been employed for pipeline tensioners.

In a most preferred embodiment at least three pairs of squeeze cylinders are provided between a track unit chassis and the frame at spaced locations along the length of the chassis. This allows to more or less independently control the actual squeeze pressure exerted by the tensioner track on the pipeline or the like for each portion of the chassis on which an actuator engages. When three cylinders are used this allows e.g. to set the squeeze pressure in the central region of the chassis at a different level than at both end regions (which may also be set at different levels). Such control of the exerted squeeze pressure on the length of pipeline held between the tracks is highly advantages in view of the desired or required "holding capacity" on the one hand and the effects of the squeeze pressure on the pipeline (or its coating etc) on the other hand.

It is further preferred that said cylinders are hydraulic cylinders and wherein said control mechanism is a hydraulic control mechanism that allows to control the pressure within each cylinder independently.

The tensioner frame comprises an annular structure absorbing the squeeze forces of the squeeze cylinders. Possibly the tensioner has an annular frame comprising multiple ring frame members spaced along the axis of the tensioner and interconnected by further, preferably axially extending, frame members. In a preferred embodiment, the annular structure of the tensioner frame is composed of plate elements interconnected so as to form a single walled annular structure. This attributes to a very compact tensioner.

Even more preferably, the tensioner frame comprises a top plate and a bottom plate at the axial ends of the tensioner frame, said plates having an opening therein to allow for the passage of the elongated article. This attributes to the stiffness of the tensioner.

Possibly the tensioner frame is designed so that the tensioner can be opened.

In a preferred embodiment the tensioner frame includes a base part, e.g. essentially U-shaped in cross-section, onto which one or more track units have been mounted, and two or more other frame parts, which are then interconnected to form the ring frame members, wherein the free ends of the frame parts are interconnectable/detachable via connecting members, e.g. pins which can be fitted through aligned openings in the free ends.

Other designs of the connecting structure between the chassis and the frame, such as a slide structure, possibly including wheels, or telescopic structure arranged—e.g. at right angles—to the chassis and the pipeline trajectory are also possible. Preference is however given to the single central linkage bar assembly as disclosed herein.

In a preferred embodiment, the connecting structures are each adapted to—in addition to the lateral motion—allow for a pivotal motion of each track unit so as to obtain a non-parallel orientation of the tracks of the track units with respect to the elongated article passage axis.

By allowing pivotal motion it is possible to arrange the tracks e.g. such that a tapered section of the pipeline can be supported and passed through the tensioner without overloading of the pipeline. Also this pivotal arrangement allows for accurate control of squeeze force, and thus of squeeze pressure on the pipeline.

This aspect is explained in more detail in pending application WO 2009/088287 of the same applicant.

In a preferred embodiment the connecting structure of each track unit consist of a linkage bar assembly which is pivotally connected to the upper portion of the chassis at a chassis end thereof and pivotally connected to the frame at a frame end thereof. Most preferred each linkage bar assembly includes two linkage bars on opposite sides of the track unit chassis, which allows to counteract any tendency of the chassis to rotate about its longitudinal axis. Said linkage bars may be connected via a transverse member when desired. Axial rotation can additionally be prevented by the provision of sliding pads, and by providing a closed structure for the track units.

In a preferred embodiment the linkage bar assembly is arranged so as to be oriented generally parallel to the elongated article axis during operation of the tensioner. This allows the central linkage bar assembly to be subjected to tensile stresses during operation of the tensioner.

In a possible embodiment the central linkage bar assembly is arranged so as to be inclined with respect to the passage axis during operation of the tensioner, the linkage bar—from its frame end to its chassis end—generally extending counter to the direction of the pipeline load. This cause a "self-clamping effect" of the tracks onto the pipeline or the like. It is noted that in practice the major part of the squeeze force will be provided by the squeeze cylinders, e.g. about 10% of the squeeze force being provided via this central linkage bar assembly.

According to a second aspect of the present invention the above aim to propose an improved marine tensioner is achieved in an alternative way.

The second aspect of the invention achieves the above aim by providing a marine tensioner according to the preamble of claim 3, wherein the connecting structure between the chassis of each track unit and the tensioner frame comprises a chassis lift mechanism for the chassis of each track unit, wherein said chassis lift mechanism comprises a drive motor distinct from the squeeze cylinders, and said chassis lift mechanism being adapted to raise the chassis between a lowered and a raised position, and thereby cause tilting of the hydraulic squeeze cylinders of a track unit between an operative position in the lowered position of the chassis lift mechanism, wherein the squeeze cylinders are operative to exert a squeeze force in use of the tensioner for handling an elongated article, and an oversized article passage position in the raised position of the chassis lift mechanism, wherein—to allow for the passage of an oversized article through the tensioner, without exerting a squeeze force with the track unit, the track unit is moved maximally towards the tensioner frame—the effective dimension of the tilted squeeze cylinders seen in lateral direction is less than with said squeeze cylinders in fully retracted condition in their operative position.

By allowing lift of the chassis and causing tilt of the hydraulic squeeze cylinders, the retraction of the chassis of the track unit to allow the passage of large items, such as accessories, is not only achieved by retraction of the squeeze cylinders, but also by the tilt of the squeeze cylinders. Thus, the chassis of the track unit can be retracted significantly closer to the tensioner frame. In all, a more compact tensioner is obtained.

Preferably, the connecting structure comprising the chassis lift mechanism is composed of an essentially vertical cylinder provided between the chassis of each track unit and the tensioner frame. It is preferred that the cylinder is in its retracted position when the chassis is in its lowered position and the squeeze cylinders are in their operative position, to support the axial forces of the elongated article. Upon extension of the cylinder, the chassis lift mechanism raises the chassis to the raised position, thereby tilting the squeeze cylinders provided between the tensioner frame and the chassis and bringing the tensioner in the oversized article passage position. Alternatively, the chassis lift mechanism can comprise rods.

The chassis lift mechanism may be provided adjacent the chassis of each track unit, and partially adjacent the squeeze actuators. As such, the chassis lift mechanism does not contribute to an increased tensioner frame dimension.

Preferably multiple squeeze cylinders are provided between a track unit chassis and the frame at spaced locations along the length of the chassis.

According to a third aspect of the invention, an improved tensioner is obtained by providing a marine tensioner according to the preamble of claim 1, wherein the tensioner frame is generally box-shaped and of an essentially closed circumferential structure, composed of steel plates, preferably welded plates.

By using steel plates instead of conventional tubular frameworks, a reduction in the tensioner frame dimensions is achieved, and thus a tensioner of reduced size is obtained.

Another advantage of using steel plates in a large generally box-shaped configuration is that a very stiff tensioner frame is obtained. As a consequence, it is possible to handle elongated articles with only few of the available track units, for example two instead of four track units, without having to interconnect the track units handling the elongated articles. Interconnection is generally necessary to obtain the desired stiffness for handling the elongated articles, but according to the third aspect of the invention, this stiffness is obtained by the stiff tensioner frame.

In a preferred embodiment the tensioner frame includes a base part, e.g. essentially U-shaped in cross-section, onto which one or more track units have been mounted, and one or more other frame parts, which are interconnected to form the generally box-shaped tensioner frame of essentially closed circumferential structure. The free ends of the frame parts are interconnectable/detachable via connecting members, e.g. pins which can be fitted through aligned openings in the free ends. As such, it is possible to open the tensioner.

Preferred embodiments of the tensioner will now be explained in detail referring to drawing.

The present invention further relates to a marine pipelaying vessel provided with such a tensioner as well as to a method of pipelaying wherein use is made of such a tensioner.

In the drawings:

FIGS. 6a-6f show two embodiments of a marine tensioner according to the second aspect of the invention.

Figure 1A:
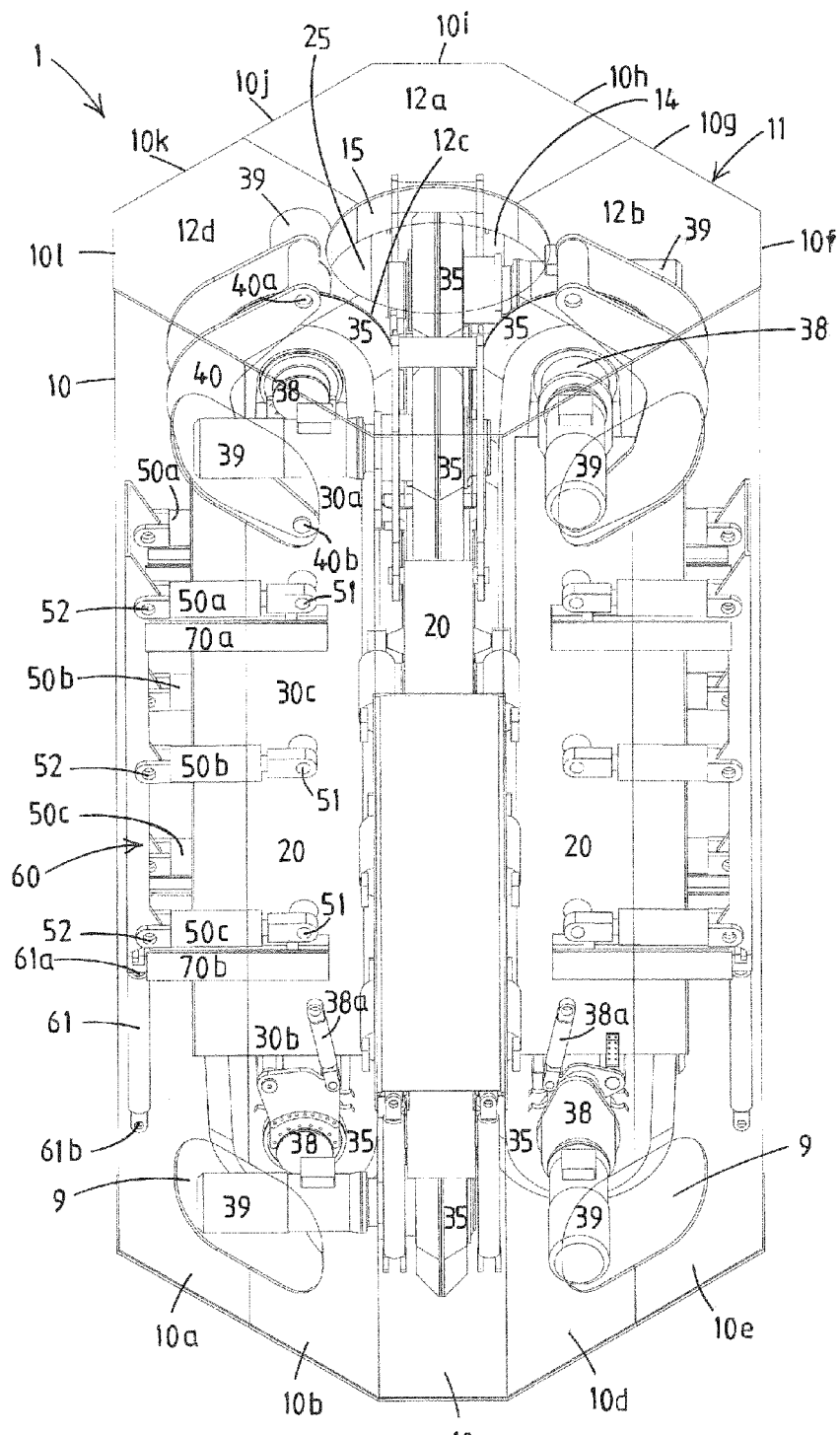
FIG. 1a shows an example of a marine tensioner in a perspective and cut-away view, wherein the tensioner is in an operative position for handling an elongated article of a relatively large diameter.
Figure 1B:
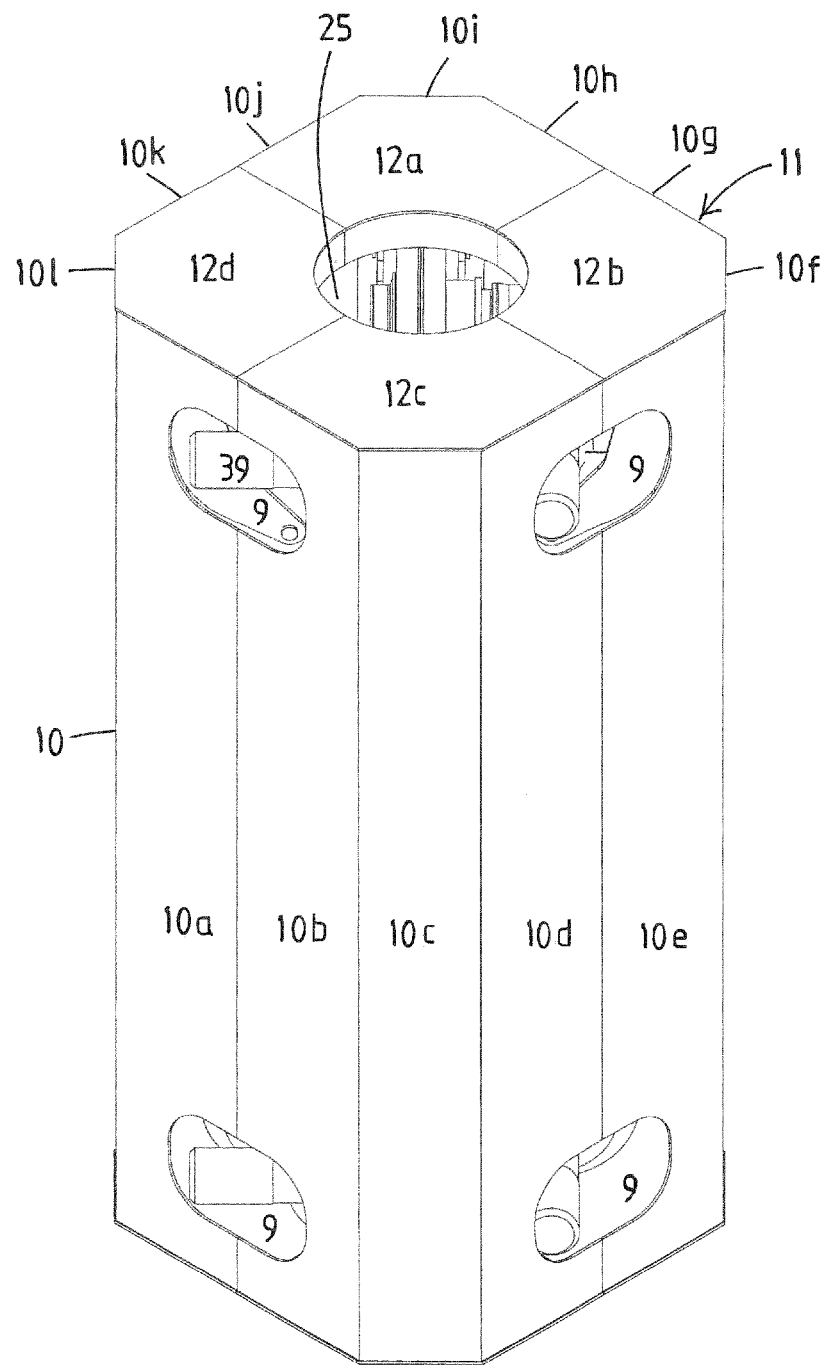
FIG. 1b shows the marine tensioner of FIG. 1a, in a non cut-away view, in an operative position for handling an elongated article of a relatively large diameter.
Figure 1C:
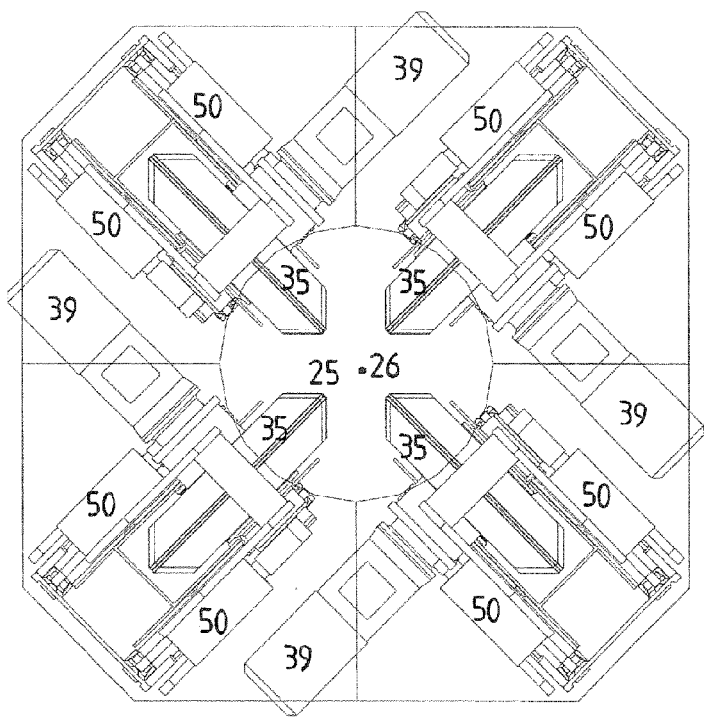
FIG. 1c shows the marine tensioner of FIG. 1a, in a cut-away view from above, in an operative position for handling an elongated article of a relatively large diameter.

In FIGS. 1a-1c a marine tensioner 1 is shown schematically. The tensioner 1 is suitable for handling an elongated article (not shown) from an offshore vessel, such as laying a pipeline from a marine pipeline installation on board a vessel or for handling an umbilical for underwater equipment from an umbilical handling device on board the vessel, said tensioner being adapted to absorb the load exerted by said elongated article on the tensioner.

The tensioner 1 comprises a tensioner frame 11, e.g. adapted to be supported in a pipelaying installation, which is more clearly visible in FIG. 1b than in the cut-away view of FIG. 1a. The tensioner frame 11 comprises an annular structure 10 absorbing the load exerted by the elongated article (not shown). In general, said annular structure 10 may include one or more mobile parts that in an opened position allow for lateral introduction of an article into the tensioner frame 11 and in a closed position close the annular structure 10 in load bearing manner. In the shown embodiment, the annular structure 10 does not comprise any mobile parts, which contributes to the stiffness of the construction.

In the shown embodiment, the annular structure 10 of the tensioner frame 11 is composed of plate elements 10a-10l interconnected so as to form a single walled annular structure. The tensioner frame 11 is generally box-shaped and of an essentially closed circumferential structure. In the shown embodiment, twelve plate elements 10a-10l are interconnected to form an octagonal structure.

Figure 2:
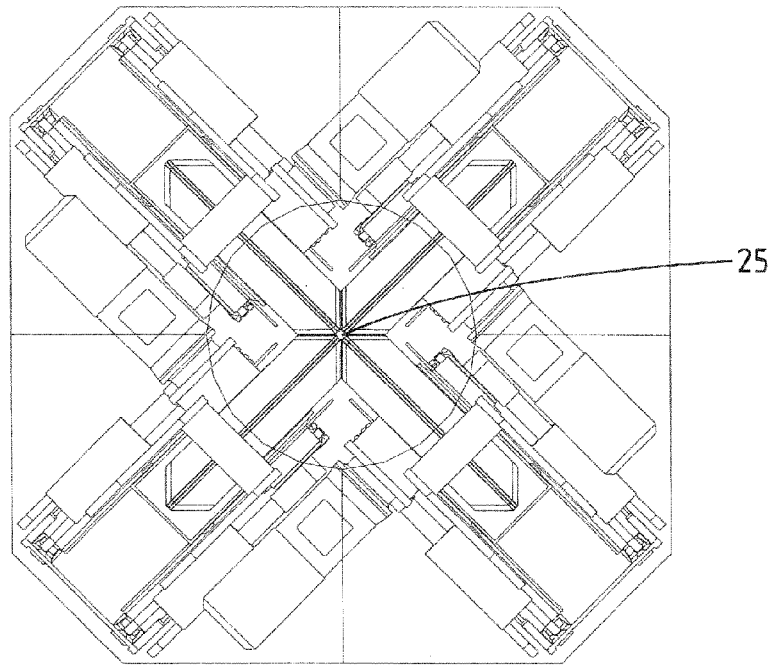
FIG. 2 shows the marine tensioner of FIG. 1a, in a cut-away view from above, in an operative position for handling an elongated article of a relatively small diameter.

In the tensioner 1 an article passage 25 is visible, allowing the passage of elongated articles, having a passage axis 26 extending axially, and preferably centrally, through the tensioner frame. This is in particular visible in the cut-away view from above, in FIG. 1c. In FIG. 2, the same tensioner 1 now suitable for handling elongated articles of smaller diameter is shown, through the now smaller passage 25' with the same passage axis 26.

Here, the tensioner frame 11 further comprises a top plate 12 (here composed of four interconnected plates 12a-12d) and a bottom plate (not shown). The top plate 12 and the bottom plate are connected at the axial ends of the tensioner frame 11 to the annular structure 10. The top plate 12 has an opening 14 therein to allow for the passage of the elongated article (not shown). The opening 14 is preferably reinforced, e.g. by a flange 15 as in the shown embodiment. Likewise, the bottom plate is also provided with an opening. These openings are part of the article passage 25.

According to the invention, the plate elements are preferably steel plate elements, but it is also conceivable that the plate elements are made from fibre-reinforced plastics.

The tensioner 1 further comprises multiple track units 20. In general, four track units are provided as shown in FIG. 1, although two, three, five ore even more track units are also quite common and are also within the scope of this invention.

The multiple track units 20 are mounted in the tensioner frame 11, defining the article passage 25. Preferably, the multiple track units 20 are distributed symmetrically around the article passage 25.

Each track unit 20 comprises an elongated chassis 30, said chassis having end portions 30a, 30b at opposed ends thereof as well as a central portion 30c between said end portions.

Each track unit 20 further comprises an endless track 35 supported by said chassis 30 via axes 38. The track unit 20 further comprises a track motion control device 39 for effecting controlled motion of the endless track 35. Commonly, the endless tracks 35 have a multitude of friction elements (not shown) adapted to engage on the elongated article. As is common practice, the endless tracks 35 can be tensioned by symmetrically provided chain tensioners 38a.

Between the chassis 30 of each track unit 20 and the tensioner frame 11 a connecting structure is provided that at least allows for lateral motion of the track unit 20 with respect to the passage axis 26 so as to adapt the position of the track unit 20. In the shown embodiment, the connecting structure is composed of two parallel plates, each shaped as a boomerang 40, one end of which is pivotably connected, via horizontal pivot axis 40a, to the tensioner frame 11, in particular top plate 12d. The other end of the boomerang plates 40 is pivotably connected, via horizontal pivot axis 40b, to the upper end 30a of the track unit 20. As such, the connecting structure counteracts any tendency of the chassis to rotate about its longitudinal axis. Axial rotation of the chassis is additionally prevented by the provision of sliding pads 70a, 70b, for the track unit 20.

According to a preferred embodiment, the connecting structures 40 are each adapted to—in addition to the lateral motion—allow for a pivotal motion of each track unit so as to obtain a non-parallel orientation of the tracks of the track units with respect to the passage axis. This is not visible in FIG. 1.

For each track unit 20 a group of hydraulic squeeze cylinders, here three pairs of squeeze cylinders as visible in FIG. 1c is provided between the tensioner frame 11 and the chassis 30 of the track unit. For clarity reasons, only for one track unit, the squeeze cylinders are labeled 50a, 50b, 50c. These squeeze cylinders 50a, 50b, and 50c are connected to the upper end portion of the chassis 30a, the central portion of the chassis 30c, and the lower end portion of the chassis 30b respectively. In the shown embodiment, the ends of the squeeze cylinders are pivotably connected to the tensioner frame 11 and the chassis 30 via pivot axes 52 and 51 respectively. The annular structure 10 absorbs the squeeze forces of these squeeze cylinders. The squeeze cylinders of the other track units are provided in a similar way.

A cylinder control mechanism (not shown) is provided which is associated with said squeeze cylinders 50a-c and allow to control the squeeze force exerted by the friction elements (not shown) of the endless track 35 of the track unit 30 on the elongated article (not shown).

According to the first aspect of the present invention, the tensioner further 1 comprises a tilting mechanism 60 for the group of squeeze cylinders 50a, 50b, 50c of each track unit 30. Each hydraulic squeeze cylinder 50a-c being pivotably connected via pivot axes 52 at its end facing the tensioner frame 11 to said tilting mechanism 60. Alternatively, not shown, the other ends of the hydraulic cylinders are attached to the tilting mechanism 60.

Said tilting mechanism 60 comprises a drive 61, distinct from the squeeze cylinders 50. In the shown embodiment, the drive motor 61 of the tilting mechanism 60 comprise a cylinder, connected with one end 61a to the tilting mechanism 60 and with the other end 61b to the tensioner frame 11.

Figure 3A:
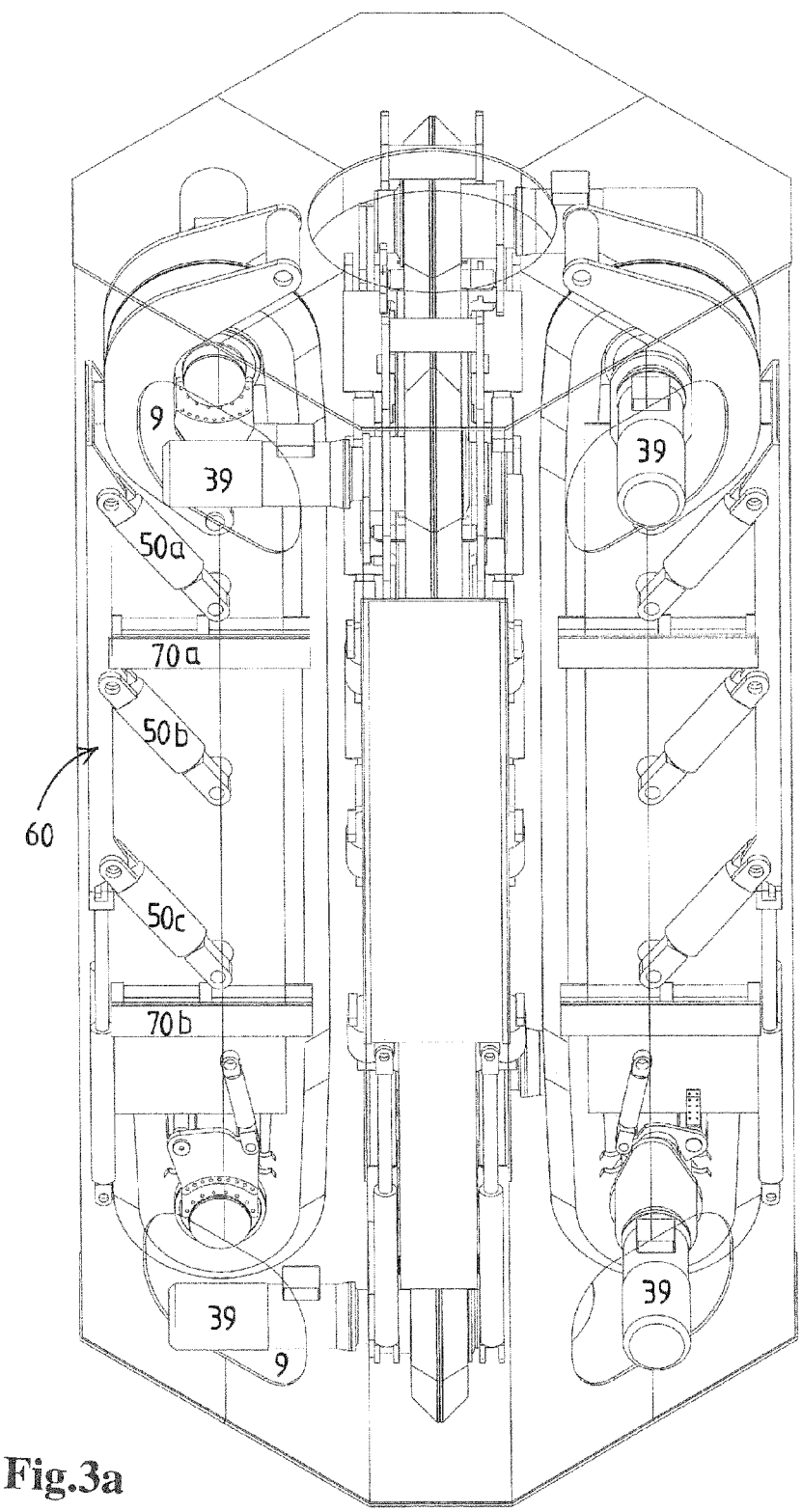
FIG. 3a shows the marine tensioner of FIG. 1a in a perspective and cut-away view, in an oversized article passage position.
Figure 3B:
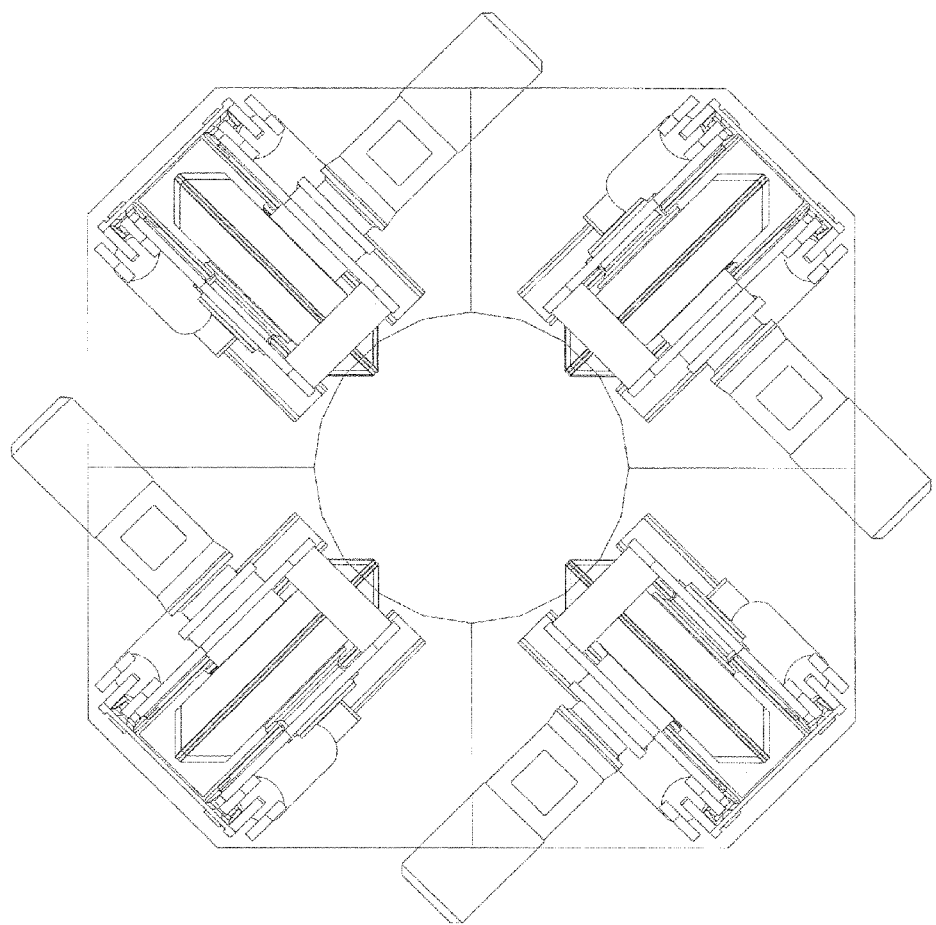
FIG. 3b shows the marine tensioner of FIG. 3a in a cut-away view from above, in an oversized article passage position.

According to the first aspect of the invention, said tilting mechanism 60 is adapted to tilt the hydraulic squeeze cylinders 50a-c of a track unit 20 between an operative position, as visible in FIG. 1, wherein the squeeze cylinders are operative to exert a squeeze force in use of the tensioner 1 for handling an elongated article (not shown), and an oversized article passage position (visible in FIG. 3), wherein—to allow for the passage of an oversized article through the tensioner 1, without exerting a squeeze force with the track unit 20, the track unit 20 is moved maximally towards the tensioner frame 11—the effective dimension of the tilted squeeze cylinders 50a-c seen in lateral direction is less than with said squeeze cylinders 50a-c in fully retracted condition in their operative position. The shown tilting mechanism 60 comprises plates, preferably steel plates.

The tilt of the hydraulic squeeze cylinders thus results in axial motion of one of the ends of the squeeze cylinders.

In the oversized article passage position, the track motion control devices 39 for effecting controlled motion of the endless track 35 are retracted towards the tensioner frame 11. In the shown embodiment, as visible in FIG. 3a and in particular in FIG. 3b, the track motion control devices 39 are retracted to such an extent that they extend outside the tensioner frame dimensions. Thus, openings 9 are provided in the tensioner frame 11.

Figure 4A:
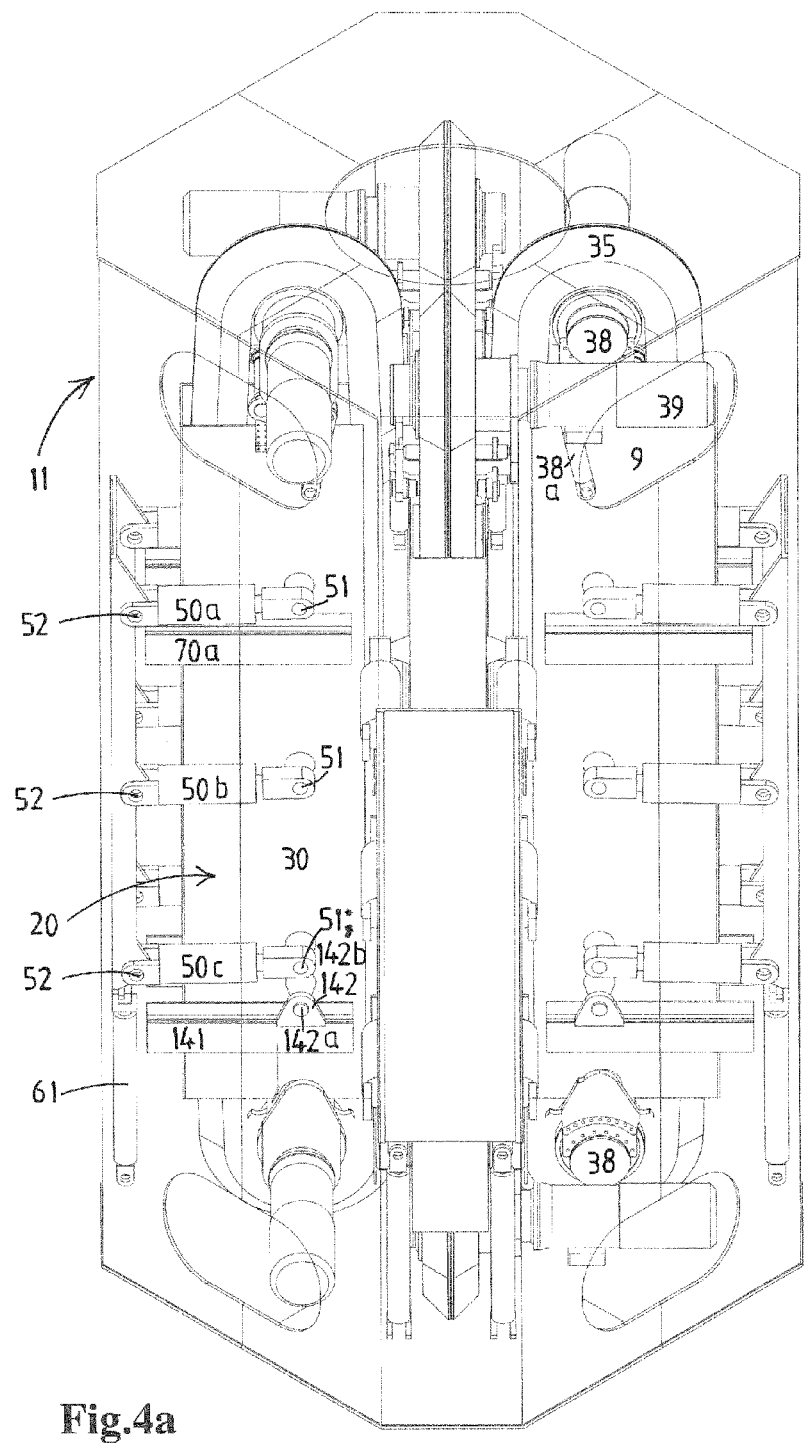
FIG. 4a shows an alternative marine tensioner in a perspective and cut-away view, wherein the tensioner is in an operative position for handling an elongated article of a relatively large diameter.
Figure 4B:
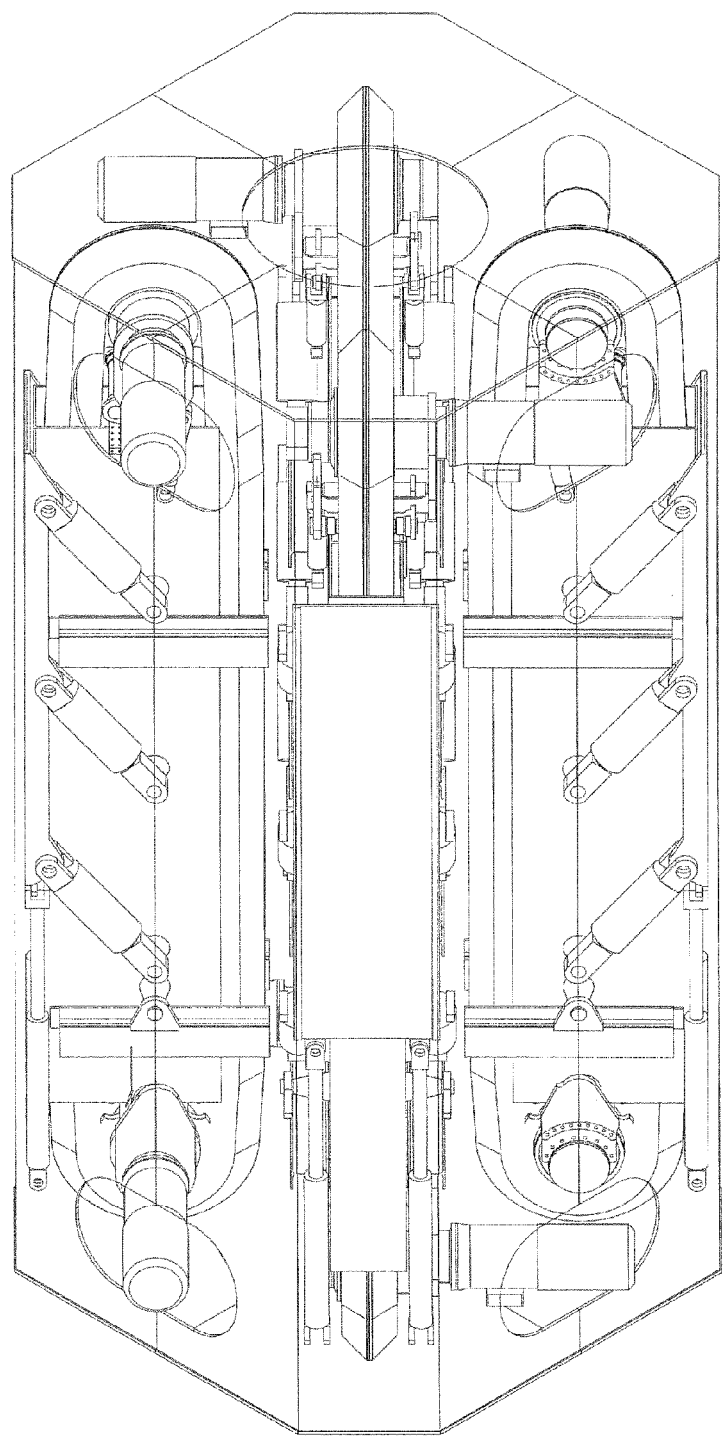
FIG. 4b shows an alternative marine tensioner in a perspective and cut-away view, wherein the tensioner is in an oversized article passage position.

In FIGS. 4a and 4b an alternative connecting structure is shown. Other parts of the tensioner similar to the tensioner of FIG. 1 are indicated with same numbers. Chain tensioner 38a is now provided at the upper support axis 38 of the endless track 35. Between the chassis 30 of each track unit 20 and the tensioner frame 11a connecting structure is provided that at least allows for lateral motion of the track unit 20 with respect to the passage axis 26 so as to adapt the position of the track unit 20. In the shown embodiment, the connecting structure is composed of two parallel guides 141 (only one of which is visible in FIG. 4), provided adjacent the lower squeeze cylinders 50c. The guide 141 comprises a guiding structure 142. One end of this guiding structure is pivotably connected, via horizontal pivot axis 142a, to the tensioner frame 11, via a frame part (not shown). The other end of the guiding structure 142 is pivotably connected, via horizontal pivot axis 142b, to the pivot axis 51 of the squeeze cylinder 50c. The operation of the guiding structure 142 is in particular visible in FIG. 4b. As such, the connecting structure counteracts any tendency of the chassis to rotate about its longitudinal axis. Axial rotation of the chassis is additionally prevented by the provision of one or more sliding pads 70a for the track unit 20.

Figure 5:
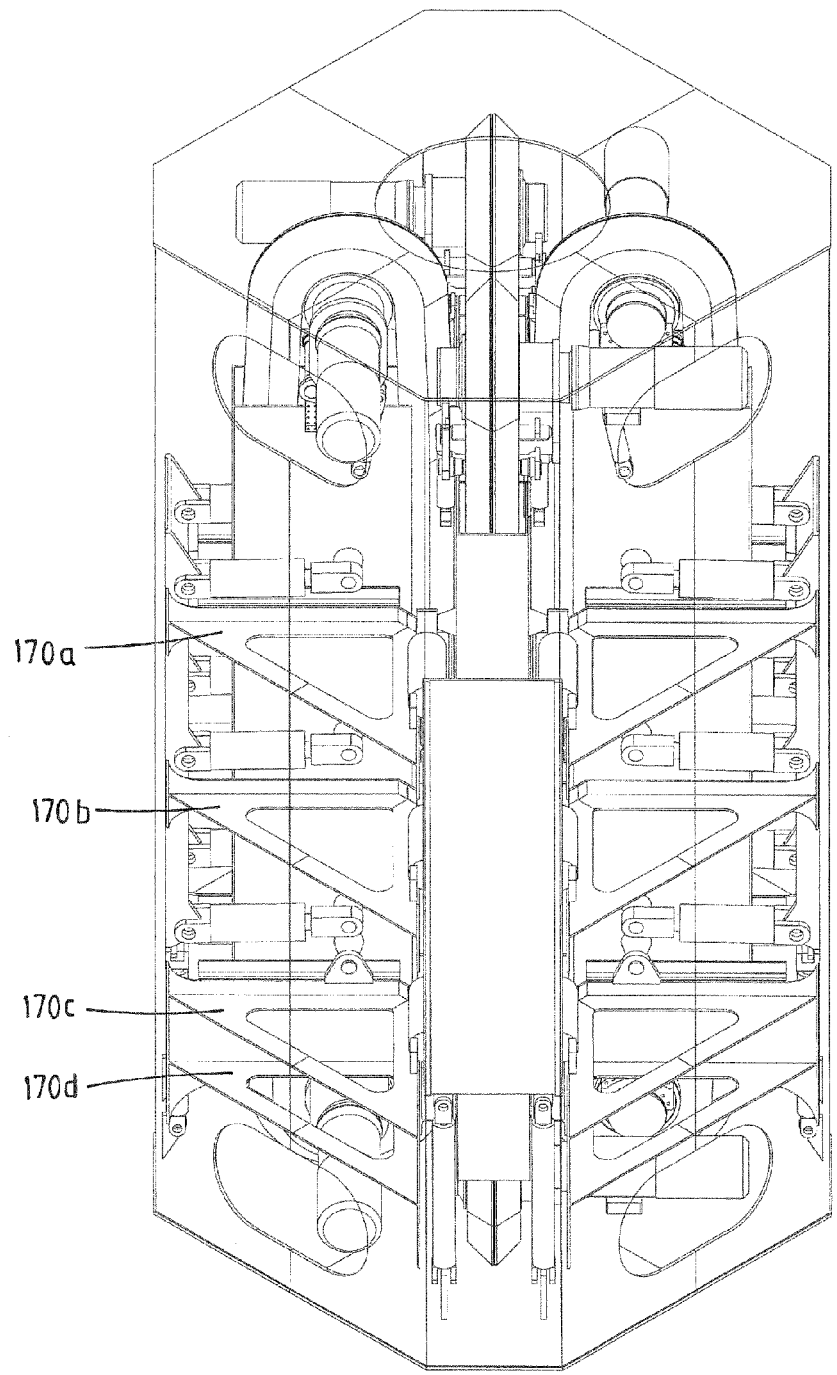
FIG. 5 shows yet an alternative marine tensioner in a perspective and cut-away view, wherein the tensioner is in an operative position for handling an elongated article of a relatively large diameter.

In FIG. 5 a very similar marine tensioner resembling the tensioner of FIG. 4 is shown. The embodiment of FIG. 5 differs from the embodiment of FIG. 4 in that instead of sliding pads 70a for the track unit 20, closed structures 170a, 170b, 170c, 170d are provided to prevent axial rotation of the track units.

In FIGS. 6a-6f two embodiments of a marine tensioner 200, 300 according to the second aspect of the invention are shown.

The marine tensioners 200, 300 are suitable of handling an elongated article from an offshore vessel, such as laying a pipeline from a marine pipeline installation on board a vessel or for handling an umbilical for underwater equipment from an umbilical handling device on board the vessel, said tensioner being adapted to absorb the load exerted by said elongated article on the tensioner.

The tensioner 200, 300 comprises a tensioner frame, not shown, and multiple track units 231, 331, two of which are shown. The tensioner frame is not shown, but portions of the tensioner frame are indicated with reference number 240, 340. The track units 231, 331 are to be mounted in said frame and define an article passage 235, 335 having a passage axis 236, 336 extending axially, and in the shown embodiments centrally, through the tensioner frame.

Each track unit comprises an elongated chassis 230, 330, not shown in detail, and an endless track, around schematic lines 233, 333, supported by said chassis and a track motion control device (not shown) for effecting controlled motion of the endless track, the endless track having a multitude of friction elements (not visible) adapted to engage on the elongated article.

Between the chassis 230, 330 of each track unit 231, 331 and the tensioner frame 240, 340, a connecting structure 260, 360 is provided to support the axial forces of the elongated article. The connecting structures 260, 360 allow for lateral motion of the track unit with respect to the passage axis 235, 335 so as to adapt the position of the track unit. This lateral motion is visible when comparing FIGS. 6a and 6b or FIGS. 6d and 6e.

For each track unit 231, 331, a group of hydraulic squeeze cylinders is provided between the tensioner frame 240 and the chassis 230, 330 of the track unit. In FIGS. 6a-6c each track unit 230 comprises two squeeze cylinders 250a, 250b. In FIGS. 6d-6f each track unit 231 is provided with three squeeze cylinders 250c, 250d, 250e. The ends of the squeeze cylinders are pivotably connected to the tensioner frame 240, 340 and the chassis 230, 330 via pivot axes 252, 352 and 251, 351 respectively.

A cylinder control mechanism (not shown) is provided which is associated with said squeeze cylinders and allows to control the squeeze force exerted by the friction elements of the endless track of the track unit on the elongated article.

In FIGS. 6a, 6b, 6d, 6e the squeeze cylinders are shown in an operative position, wherein the squeeze cylinders are operative to exert a squeeze force in use of the tensioner for handling an elongated article.

According to the second aspect of the invention, the connecting structure 260, 360 between the chassis 230, 330 of each track unit and the tensioner frame 240, 340 comprises a chassis lift mechanism for the chassis of each track unit. In the shown embodiment this is achieved in that the connecting structure comprises a hydraulic cylinder, one end of which is pivotably attached to the chassis via pivot axis 261, 361, and the other end of which is pivotably attached to the tensioner frame 240, 340 via pivot axis 262, 362. It is noted that it may seem in FIGS. 6a and 6b that the pivot axes 262 of the connecting structure and 251 of the squeeze cylinder coincide, but this is not the case as is clear from FIG. 6c.

The said chassis lift mechanism is adapted to raise the chassis 231, 331 between a lowered position, shown in FIGS. 6a, 6b, 6d, and 6e, and a raised position, shown in FIGS. 6c and 6e. By raising the chassis 231, 331, tilting of the hydraulic squeeze cylinders 250, 350 of a track unit is effected.

In FIGS. 6c and 6e the chassis is in the raised position of the chassis lift mechanism, and the squeeze cylinders 250, 350 are tilted to and an oversized article passage position wherein—to allow for the passage of an oversized article through the tensioner, without exerting a squeeze force with the track unit, the track unit 231, 331 is moved maximally towards the tensioner frame—the effective dimension of the tilted squeeze cylinders seen in lateral direction is less than with said squeeze cylinders in fully retracted condition in their operative position.

To effect the tilting of the chassis, the chassis lift mechanism comprises a drive motor (not shown) distinct from the squeeze cylinders.

The invention claimed is:
1. A marine tensioner for handling an elongated article from an offshore vessel, said marine tensioner being adapted to absorb a load exerted by said elongated article on the marine tensioner, said marine tensioner comprising:
   a tensioner frame;
   multiple track units mounted in said tensioner frame defining an article passage having a passage axis extending axially through the tensioner frame;
   wherein each track unit of the multiple track units comprises an elongated chassis, said elongated chassis hav- ing end portions at opposed ends thereof as well as a central portion between said end portions, wherein each track unit of the multiple track units further comprises an endless track supported by said elongated chassis and a track motion control device for effecting controlled motion of the endless track, the endless track having a multitude of friction elements adapted to engage and exert a squeeze force on the elongated article, wherein between the elongated chassis of each track unit of the multiple track units and the tensioner frame a connecting structure is provided that at least allows for lateral motion of the track unit of the multiple track units with respect to the passage axis so as to adapt the position of the track unit of the multiple track units, wherein for each track unit of the multiple track units a group of hydraulic squeeze cylinders is provided between the tensioner frame and the elongated chassis of the track unit of the multiple track units, wherein a cylinder control mechanism is provided which is associated with said hydraulic squeeze cylinders and allows to control the squeeze force exerted by some of the multitude of the friction elements of the endless track of the track unit of the multiple track units on the elongated article, and wherein the marine tensioner further comprises a tilting mechanism for the group of hydraulic squeeze cylinders of each track unit of the multiple track units, each hydraulic squeeze cylinder being connected to said tilting mechanism, said tilting mechanism comprising a drive motor distinct from the hydraulic squeeze cylinders, and said tilting mechanism being adapted to tilt the hydraulic squeeze cylinders of an associated track unit between an operative position, wherein the hydraulic squeeze cylinders are operative to exert the squeeze force in use of the marine tensioner for handling an elongated article, and an oversized article passage position, wherein, to allow for the passage of an oversized article through the marine tensioner, without exerting a squeeze force with the track unit of the multiple track units, the track unit of the multiple track units is moved maximally towards the tensioner frame, an effective dimension of the tilted hydraulic squeeze cylinders seen in lateral direction is less than with said hydraulic squeeze cylinders in fully retracted condition in their operative position.

2. The marine tensioner according to claim 1, wherein the connecting structures are each adapted to—in addition to the lateral motion—allow for a pivotal motion of each track unit of the multiple track units so as to obtain a non-parallel orientation of the tracks of the multiple track units with respect to the passage axis.

3. The marine tensioner according to claim 1, wherein the tensioner frame is adapted to be supported in a pipelaying installation.

4. The marine tensioner according to claim 1, wherein the passage axis extends centrally through the tensioner frame.

5. The marine tensioner according to claim 1, wherein each hydraulic squeeze cylinder is connected at its end facing the tensioner frame to the tilting mechanism.

6. A marine tensioner for handling an elongated article from an offshore vessel, said marine tensioner being adapted to absorb a load exerted by said elongated article on the marine tensioner, said marine tensioner comprising:
a tensioner frame;
multiple track units mounted in said tensioner frame defining an article passage having a passage axis extending axially;

wherein each track unit of the multiple track units comprises an elongated chassis, said elongated chassis having end portions at opposed ends thereof as well as a central portion between said end portions, wherein each track unit of the multiple track units further comprises an endless track supported by said elongated chassis and a track motion control device for effecting controlled motion of the endless track, the endless track having a multitude of friction elements adapted to engage and exert a squeeze force on the elongated article, wherein between the elongated chassis of each track unit of the multiple track units and the tensioner frame a connecting structure is provided that at least allows for lateral motion of the track unit of the multiple track units with respect to the passage axis so as to adapt the position of the track unit of the multiple track units, wherein for each track unit of the multiple track units a group of hydraulic squeeze cylinders is provided between the tensioner frame and the elongated chassis of the track unit of the multiple track units, wherein a cylinder control mechanism is provided which is associated with said hydraulic squeeze cylinders and allows to control the squeeze force exerted by some of the multitude of the friction elements of the endless track of the track unit of the multiple track units on the elongated article, wherein the connecting structure between the elongated chassis of each track unit of the multiple track units and the tensioner frame comprises a chassis lift mechanism for the elongated chassis of each track unit of the multiple track units, and wherein said chassis lift mechanism comprises a drive motor distinct from the hydraulic squeeze cylinders, said chassis lift mechanism being adapted to raise the elongated chassis between a lowered and a raised position, thereby causing tilting of the hydraulic squeeze cylinders of an associated track unit between an operative position in the lowered position of the chassis lift mechanism, wherein the hydraulic squeeze cylinders are operative to exert the squeeze force in use of the marine tensioner for handling an elongated article, and an oversized article passage position in the raised position of the chassis lift mechanism, wherein, to allow for the passage of an oversized article through the marine tensioner, without exerting a squeeze force with the track unit of the multiple track units, the track unit of the multiple track units is moved maximally towards the tensioner frame, an effective dimension of the tilted hydraulic squeeze cylinders seen in lateral direction is less than with said hydraulic squeeze cylinders in fully retracted condition in their operative position.

7. The marine tensioner according to claim 6, wherein the connecting structure comprises a hydraulic cylinder operative as the chassis lift mechanism.

8. The marine tensioner according to claim 6, wherein the tensioner frame is adapted to be supported in a pipelaying installation.

9. The marine tensioner according to claim 6, wherein the passage axis extends centrally through the tensioner frame.

10. A marine tensioner for handling an elongated article from an offshore vessel, said marine tensioner being adapted to absorb a load exerted by said elongated article on the tensioner, said marine tensioner comprising:

a tensioner frame;

multiple track units mounted in said tensioner frame defining an article passage having a passage axis extending axially;

wherein each track unit of the multiple track units comprises an elongated chassis, said elongated chassis having end portions at opposed ends thereof as well as a central portion between said end portions, wherein each track unit of the multiple track units further comprises an endless track supported by said elongated chassis, and a track motion control device for effecting controlled motion of the endless track, the endless track having a multitude of friction elements adapted to engage and exert a squeeze force on the elongated article, wherein between the elongated chassis of each track unit of the multiple track units and the tensioner frame a connecting structure is provided that at least allows for lateral motion of the track unit of the multiple track units with respect to the passage axis so as to adapt the position of the track unit of the multiple track units, wherein for each track unit of the multiple track units a group of hydraulic squeeze cylinders is provided between the tensioner frame and the elongated chassis of the track unit of the multiple track units, wherein a cylinder control mechanism is provided which is associated with said hydraulic squeeze cylinders and allows to control the squeeze force exerted by some of the multitude of the friction elements of the endless track of the track unit of the multiple track units on the elongated article, wherein the tensioner frame comprises an annular structure absorbing the squeeze forces of the hydraulic squeeze cylinders, wherein the annular structure of the tensioner frame is composed of plate elements interconnected so as to form a single walled annular structure, and wherein openings are provided in the tensioner frame, allowing the track motion control device to extend therethrough.

11. The marine tensioner according to claim 10, wherein the tensioner frame comprises a top plate and a bottom plate at the axial ends of the tensioner frame, said top and bottom plates having an opening therein to allow for the passage of the elongated article.

12. The marine tensioner according to claim 10, wherein the tensioner frame is adapted to be supported in a pipelaying installation.

13. The marine tensioner according to claim 10, wherein the passage axis extends centrally through the tensioner frame.

* * * * *